United States Patent [19]

Haubner et al.

[11] Patent Number: 4,459,591

[45] Date of Patent: Jul. 10, 1984

[54] REMOTE-CONTROL OPERATING SYSTEM AND METHOD FOR SELECTIVELY ADDRESSING CODE-ADDRESSABLE RECEIVERS, PARTICULARLY TO EXECUTE SWITCHING FUNCTION IN AUTOMOTIVE VEHICLES

[75] Inventors: Georg Haubner, Berg; Jürgen Wesemeyer, Nuremberg; Hartmut Zöbl, Fürth, all of Fed. Rep. of Germany

[73] Assignee: Robert Bosch GmbH, Stuttgart, Fed. Rep. of Germany

[21] Appl. No.: 341,778

[22] Filed: Jan. 22, 1982

[30] Foreign Application Priority Data

Feb. 5, 1981 [DE] Fed. Rep. of Germany ....... 3103884

[51] Int. Cl.³ .......................... H04Q 9/06; H04B 9/00
[52] U.S. Cl. ............................. 340/825.57; 340/825.05; 455/603
[58] Field of Search ............... 340/825.57, 825.05, 340/52 F, 825.01; 307/10 AT; 455/613, 606, 603, 611; 370/4, 86

[56] References Cited

U.S. PATENT DOCUMENTS

| | | | |
|---|---|---|---|
| 4,016,490 | 4/1977 | Weckenmann et al. | 324/61 R |
| 4,085,403 | 4/1978 | Meier et al. | 340/168 |
| 4,091,272 | 5/1978 | Richter et al. | 455/603 |
| 4,106,490 | 4/1977 | Weckenmann et al. | 324/61 R |
| 4,107,555 | 8/1978 | Haas et al. | 307/308 |
| 4,155,075 | 5/1979 | Weckenmann et al. | 340/167 R |
| 4,160,238 | 7/1969 | Weckenmann et al. | 340/147 |
| 4,161,651 | 7/1979 | Sano et al. | 455/603 |
| 4,164,730 | 8/1979 | Weckenmann et al. | 340/168 R |
| 4,227,181 | 10/1980 | Brittain | 340/52 F |
| 4,298,930 | 11/1981 | Haubner et al. | 324/61 R |
| 4,320,388 | 3/1982 | McCarthy et al. | 455/613 |
| 4,354,267 | 10/1982 | Mori et al. | 340/825.01 |

OTHER PUBLICATIONS

"Fast Fiber Bus Points to Fast Local Nets", K. Drefack, *Electronics*, vol. 53, No. 27, Dec. 18, 1980, pp. 64;66 (S 1628-0074).

*Primary Examiner*—Donald J. Yusko
*Attorney, Agent, or Firm*—Frishauf, Holtz, Goodman & Woodward

[57] ABSTRACT

To eliminate separate clock, control, and acknowledgment communication lines in a ring-connected remote-control operating system, for example a system applied to a vehicle in which switches (29) or command signals derived from a central station (10) generate code signals to which receivers (11, 12) are responsive to carry out commands, such as energization of a relay (18), a lamp (17), a motor (16, 20) or the like, or cause retransmission to the central station of a sensed operating signal, for example fuel level, for display on a display unit (28), only a single communication line (8), preferably in form of a light guide (15), is provided coupled to the central station (10) and to the respective receivers. The coding is effected by applying to the single line (15) cyclical pulse sequences. The pulse sequences are arranged to form codes which are derived by making the pulses of different pulse widths, and the pulse gaps of respectively different pulse gap widths, and sensing the number of pulses, the pulse widths, and the duration of the pulse gaps between the pulses to thereby obtain coding which is related to clock signals (B), synchronization signals (C), control signals (0, 1), as well as acknowledgment signals (B'). The decoding system includes timing circuits which respond respectively, to the timing pulse pauses and to the time duration of individual pulses.

24 Claims, 6 Drawing Figures

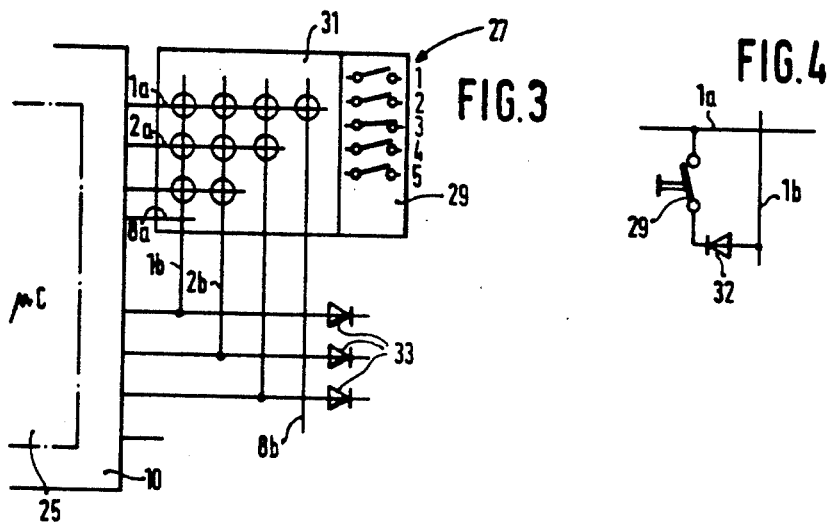
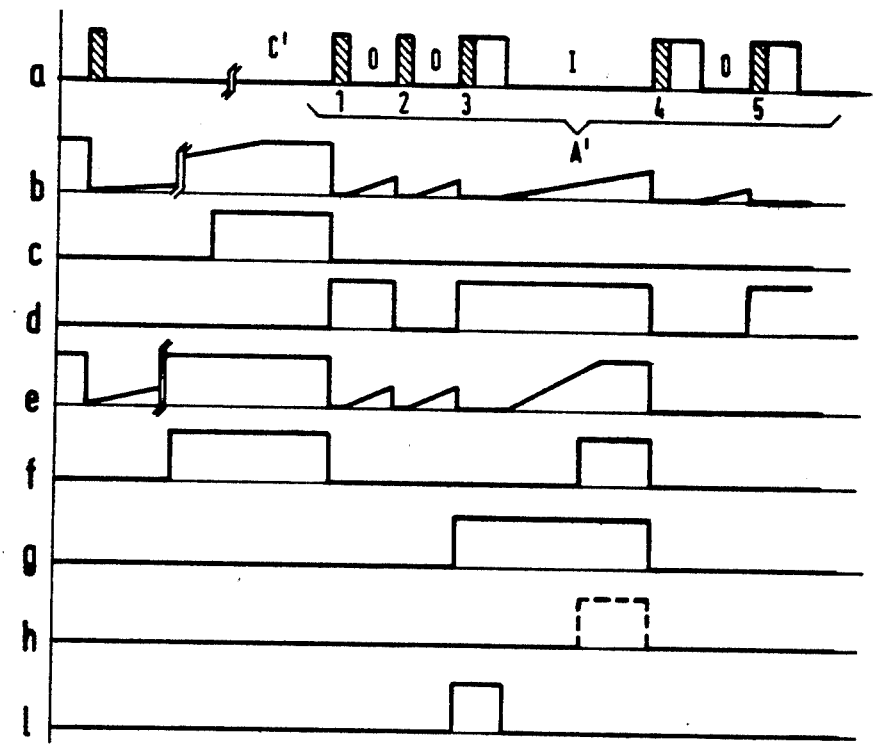

REMOTE-CONTROL OPERATING SYSTEM AND METHOD FOR SELECTIVELY ADDRESSING CODE-ADDRESSABLE RECEIVERS, PARTICULARLY TO EXECUTE SWITCHING FUNCTION IN AUTOMOTIVE VEHICLES

Cross reference to related patents, assigned to the assignee of the present application:
U.S. Pat. No. 4,016,490, WECKENMANN et al., relating to an operating switch;
U.S. Pat. No. 4,017,555, HAAS et al., relating to an operating switch;
U.S. Pat. No. 4,085,403, MEIER et al., disclosing a basic system;
U.S. Pat. No. 4,155,075, WECKENMANN et al., programming of selection cycles by pauses of clock cycles on a clock line;
U.S. Pat. No. 4,160,230, WECKENMANN et al, extended acknowledgment recognition;
U.S. Pat. No. 4,164,730, WECKENMANN et al, polarized power supply;
U.S. Pat. No. 4,160,238 WESEMEYER, monitoring pulse interrogation stage connected to a clock bus.
German Patent Disclosure Documents:
DE-OS No. 25 06 073
DE-OS No. 28 14 124 (to which U.S. Pat. No. 4,298,930 corresponds).

The present invention relates to a remote-control system and method, and more particularly to a method and system for selectively controlling response of receivers to, then, effect, typically, switching or measuring functions. Such a system is useful, for example, in automotive vehicles to control energization of selected loads, for example connection of lights, operation of fans, or other accessories, and further to transmit sensed information, for example available fuel, temperature, or the like. The remotely controlled or transmitting devices are connected for power supply to a power bus and, in accordance with the present invention, to a single control line which provides selective addressing signals as well as acknowledgment signals that the commanded function has been carried out, on the same line.

BACKGROUND

Various types of remote-control operating and/or sensing or measuring systems are known, and the present invention is specifically directed to the type of system described in the referenced U.S. Pat. No. 4,085,403, MEIER. The system of the referenced patent is specifically arranged to selectively control operation, or sense a measurement value of devices located in automotive vehicles, in which the various devices are spatially distributed throughout the vehicles. For control and transmission of acknowledgment and/or measurement signals, a ring bus system is provided which, for example, can be located within the vehicle and to which receivers are selectively attachable at any location, in which the receivers are supplied with response codes for selective addressing in accordance with the specifically assigned code from operating switches or an operating sequencing circuit. The arrangement is a digital multiplex control system. In accordance with this disclosure, the ring bus system has, besides a power supply bus, a control bus on which, from a central station, clock signals, synchronizing, and control signals are applied, connected to and transmitted to all the receivers associated with all the loads. The respective receivers contain decoding networks so that only that one of the receivers will respond to signals on the lines of the ring bus system which decodes its assigned code on the control bus. The various control signals are applied in cyclical, digital pulse sequence from the central station to the control bus. To report back to the central station that a command applied thereto actually has been executed, an acknowledgment signal is applied to an acknowledgment bus which is part of the ring line or cable. A display, then, indicates that the specific command actually has been executed.

As the number of controlled elements increases, the number of electrical connections to the ring bus, necessarily, will also increase and this, then, decreases the operating reliability of the overall system. Carelessly made connections which, for example, may be made in the field after a vehicle is originally manufactured, for example upon connecting another accessory to the ring bus system, misconnections and the like detract from the overall reliability. For example, if at a later time the user of the vehicle decides to add a remote-control antenna to an existing electrical system, connection of the respective receiver and the code assigned or associated with such an additional remote-control unit may cause difficulty.

THE INVENTION

It is an object to simplify the overall system so that the ring bus, to which all the loads are to be connected, will consist only of a single communication line, physically associated, for example, with a power supply cable so that connections to the receiver or subsequently installed receivers can be reliably made to the single communication line since distinguishing between the power supply bus and the communication line is usually simple.

Briefly, a plurality of receivers, such as for example receivers associated with devices such as fan motors, windshield wipers, or sensing elements such as a fuel gauge, each have a decoder associated therewith, responsive to a specific code assigned to the particular device. A data input unit is provided on which manually operated switches can be located to control specific functions, for example energization of the windshield wiper; additionally, periodically recurring sensing signals can be generated to energize sensors, such as the fuel supply sensor, to provide output signals representative of the fuel supply availability. A data receiver and display unit is provided to display the status of the addressed device, for example whether a switching command has been executed, or to display a sensed value, for example available fuel. A code generator and recognition device is associated with the central station, generating codes to which the respective receivers respond, and which decodes the response received from the receiver, for example by displaying a sensed value. The receivers and the central station are all connected to a ring bus.

In accordance with the invention, the ring bus is a single communication line, in a preferred form a light guide. The code generating element comprises a code generator which generates cyclically recurring pulse sequences. The pulse lengths and gaps between pulses determine the code and the particular cycle of pulse sequences; thus, a very long gap between pulse sequences is indicative of a new cycle of sequential sequences and, additionally, providing for synchronization of counters in the receivers, for example for reset of all the counters to an initial value, typically zero. The number of pulses, as well as the lengths of gaps between pulses, are detected and, in accordance therewith, respective receivers can be addressed by a code based on number and length of pulses and pulse gaps. Acknowledgment signals are then generated by changing, for example, the pulse gaps.

As used herein, the term "pulse" refers to generation of an electrical signal, and the term "pulse gap" refers to its absence. Since, of course, the system may use inverter circuits in which, relating to one code, a "pulse gap" results in an actual voltage signal, the term "pulse" or "pulse gap" is used herein for ease of explanation, but as used in the specification and the claims, of course, is equally applicable to the inverse, that is, to pulse gaps and pulses, respectively.

Utilizing the single communication line in form of a light guide, and transmitting the code in form of light pulses, permits use of a high pulse repetition rate, that is, a high operating frequency, without danger of interfering pulses being applied to the operating line independently of the command system due, for example, to noise pulses which arise in automotive vehicles and which may occur at random. Such noise pulses can be induced in a control bus of an automotive vehicle, for example, when the vehicle passes beneath a high-tension transmission line, adjacent the catenary system of an electric railway, or the like. To prevent erroneous operation, signaling systems utilizing electrical signal transmissions require filtering and/or noise pulse suppression circuits. Using the communication line in form of a light guide avoids the necessity for such additional and accessory apparatus, while improving the signal/noise ratio of the overally system.

The arrangement has the advantage that, besides the power supply bus, the ring bus requires only a single control cable to which all the receivers which are to respond to control signals, as well as the receivers connected to sensing elements, can be coupled. The ring bus, of course, is also coupled to the central station. The single control line will carry clock signals, synchronization signals, control or data signals, as well as acknowledgment data signals. This substantially decreases the material and labor costs upon initial installation of the ring bus system in the motor vehicle. Such a light guide cable can be placed, for example, in the vehicle as it is originally made, in a suitable location where various accessories are usually installed or may be added. The number of physical connections to the ring bus system is reduced, since only a single connection to the control light guide is necessary. Thus, the number of possible defective connections is reduced and the economy of installations as well as of the overall system and the operating reliability thereof is enhanced. It is also easily possible to add further loads without particular knowledge of the system which is installed, or cable coding. Thus, accessories can be added later on at service stations or by the user himself, attached to the ring bus and controlled thereby, without requiring special skills or study of the system. It is only necessary to connect the additional device to the power supply bus—readily identified and available in all motor vehicles, and the receiver to the single control line, preferably the light guide cable.

Use of the light guide has the specific advantage that it is bilateral, that is, can readily transmit signals between the transmitter and receiver, in both directions, and thus is capable of handling the acknowledgment signals as well as the initial command signals. To couple input and output pulses to the light guide, it is only necessary to couple an electro-optical coupler to the light guide, the electro-optical coupler including, for example, a luminescent diode, or the like.

DRAWINGS

FIG. 3 is a fragmentary detail diagram of the data input at the central station;

FIG. 4 is a fragmentary circuit diagram of a data input switch for use in the system of FIG. 3;

FIG. 6 is a pulse timing and signal diagram illustrating the signals which appear at various junction or connecting points of the network of the receiver of FIG. 5.

Figure 1:
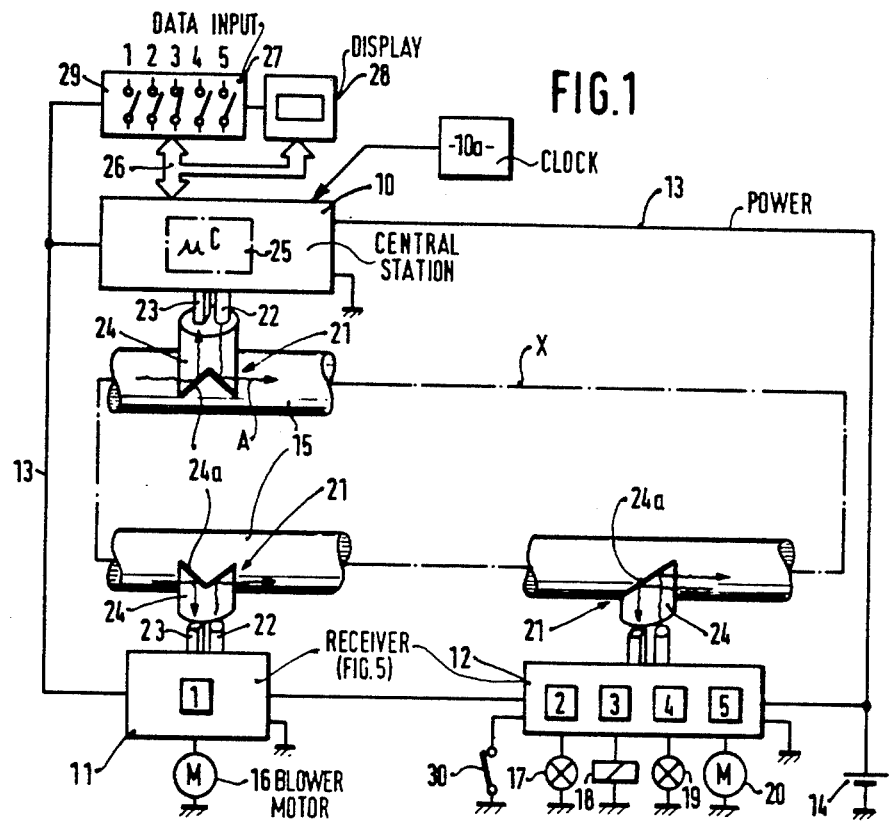
FIG. 1 is a schematic block diagram of a remote-control system in accordance with the invention, applied to control operations in an automotive vehicle, and having a plurality of receivers and a central station.

A central station 10 (FIG. 1) is connected to receiver stations 11, 12; only two such receiver stations are shown in FIG. 1, although, of course, a substantially larger number may be connected thereto. The receiver stations 11, 12 and the central station 10 are interconnected by a ring bus which includes a power bus 13, shown only schematically, and a ring or closed loop control line x which, in accordance with a preferred example, is formed by a light guide 15. The power bus 13 is connected to the vehicle battery 14, the return connection being formed by a chassis or ground bus system of the vehicle, and indicated only schematically as ground connection.

All electrically operative or controllable devices within the vehicle can be connected to the remote-control system. Additional accessories or sensors to be installed later, likewise, can be connected to the system. In the illustration selected, the receiver 11 is connected to energize a motor 16 for a blower, for example coupled to the heater or air-conditioning system of the vehicle. The receiver 12 is connected to the external lighting system of the vehicle, and controls a number of parking lights 17, shown only schematically, a relay 18 for high-beam headlights; lamps or connections 19 for low-beam headlights; and a motor 20 for operating a headlight cleaning wiper blade. Various other types of receivers can be used with the system and, of course, some of the receivers may be associated with transducers, such as fuel gauges, temperature sensors, and the like, which respond, upon addressing, not only with an "acknowledgment" signal, but also with a signal which is representative of data, for example the state of fuel supply in the tank of the vehicle.

The light guide 15 has junctions or couplers 21 coupled thereto at all of the receivers, as well as at the central station. The couplers 21 include opto-electrical transducers 22, 23 which are electrically connected with the central station 10 and the receivers 11, 12, respectively. The opto-electrical transducers have a light signal receiver 22, preferably a photo diode, and a light signal transmitter 23, preferably a light emitting diode (LED). The opto-couplers 21, connected to the light guide 15, include at the terminal end thereof a glass window 24 having a mirrored surface 24a, so coupled to the light guide 15 that the plane of the mirrored surface 24a forms an angle with respect to the longitudinal axis X of the light guide 15. The receiver 11 has only a single control output, namely controlling ON/OFF operation of the blower motor 16. For purposes of illustration, the code assigned to the blower motor 16, and hence to the receiver 11, is the count number 1. The receiver 12 actually receives four different codes, for specific association with the four loads 17-20. The loads 17-20 have the count numbers 2, 3, 4 and 5 associated therewith.

The central station 10, which forms a transmitter station, includes a microprocessor or microcomputer 25 which is connected over a data bus 26 to an input unit 27 and to a digitally controlled display or output unit 28. The data input unit 27 has included therein all of the operating switches or operating elements which control operation of the respectively operator-controlled devices, and which have switches 29 associated therewith which are coded to be associated with the respective load devices. In the example, five operating switches 29, and having associated therewith the respective count numbers 1 to 5, are shown, although, of course, many more can be used. Any number of receivers can be coupled to the light guide ring bus 8 to which any number of loads can be connected, for selective control, and which have further count numbers associated therewith, operator-controllable by further switches similar to the switches 29. For example, the left and right headlights of a vehicle may, each, have separate receivers associated therewith, with identical count numbers for the respective codes thereof, so that, upon operation of a single switch of the data input unit 27, both the right and left side headlights will be energized. Different count numbers, of course, will be associated with the right and left side direction blinkers. Since the receivers 11, 12 are all branched from the single line 8, they are, in effect, in parallel, and also in parallel to the central station 10.

Other loads can be selectively addressed under control of the microcomputer 25 by generating count numbers associated with such other loads, for automatic sensing of data which are of importance in the operation of the vehicle. Typically, such data may be derived from the sensors coupled to the ring bus 8 and energized either inherently by the engine, or from the power bus 13. Elements which are energized by the engine, and provide output data may, for example, be a temperature sensor providing output data repesentative of engine temperature; conversion of such data from analog output to digital form may, however, require connection to the power bus 13. Transmission of such data may, however, only be needed if a certain limiting temperature is exceeded, in other words to provide a "hot" or "cold" signal. Similarly, the state of fuel supply in the tank of the vehicle can be indicated on a special display field of the display 28, in analog or digital form, upon periodic interrogation under control of the microcomputer 25, rather than by a manual input switch. Such repetitive interrogation of sensors or transducers is well known.

Figure 2:
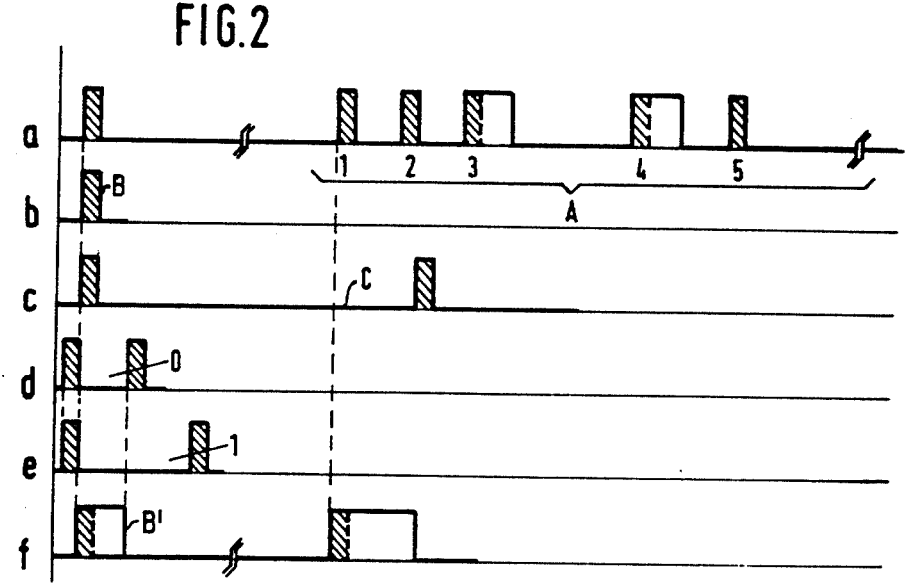
FIG. 2 is a timing diagram showing signals and signal sequences arising in the system of FIG. 1.

Basic operation, with reference to FIG. 2: A cyclical light pulse sequence A is shown in graph a of FIG. 2. The cyclical light pulse sequence may, for example, have a frequency of 20 KHz, derived from a clock source 10 connected to or forming part of the central station 10. The pulses from the central station 10 are coupled to the light guide 15 through the coupler 21. The pulse sequence A has a predetermined number of pulses B, line b of FIG. 2, which is sensed in a pulse counter stage forming part of the central station 10, as well as of all the receivers 11, 12, as will be explained below in connection with FIG. 5. Such a pulse counter, included in the receivers, is also part of the microcomputer or microprocessor 25. An extended pause or gap C occurs between the pulse sequences A, see line c of FIG. 2. The length of the pulse gap is sensed and used as a reset signal in the receiving stations 11, 12 to reset the pulse counters therein.

The respective pulses B occurring within a pulse sequence A have different intervals or gaps from each other. The pause or gap subsequent to any pulse B forms a control signal for the respective load or device connected to respective receivers which are controlled by the pulse B. A short pulse gap—see graph d of FIG. 2—forms a binary 0-signal, as a control signal for the connected device to turn the device OFF. A gap or pause of about twice the length—see graph e of FIG. 2—forms a binary 1-signal to turn the respective ON.

The user, of course, would like to be assured that the particular command which he has entered by the switch 29 of the data input unit 17 actually has been carried out. An acknowledgment signal, thus, is generated in the receiving station 11, 12 to which the respectively addressed load is connected. The acknowledgment to the central station is effected by extending the clock control pulse B to have the duration B'—see FIG. 2, graph f. Acknowledgment can be effected by, for example, an additional relay contact or by placing an additional sensor which senses that the command has been carried out, for example a light sensitive element in light-transmitting relationship to a light bulb which should light upon command in accordance with the specific operation of one of the switches 29.

If the acknowledgment or return signal should transmit a sensed value, for example the level of fuel in a tank, the extent of prolongation of the pulse B' will provide an analog value of the respectively sensed level.

The extent, in time, of the pulse sequence A changes due to the different control signals, as well as due to the different return or acknowledgment signals. Consequently, the length of the pause C (FIG. 2, graph c) will likewise change. The frequency of the pulse sequence A, however, remains invarying or constant.

The length of the pause or pulse gap C is so selected that, in any event, it is substantially longer than the pauses or gaps between the pulses of the pulse sequence A.

The ring conductor 8, formed by the light guide 15, carries all the clock, control, synchronization and acknowledgment or return signals using the cyclical light pulse sequences A. These signals are generated initially in the central station 10 and applied to all the receivers 11, 12, and such other receivers as may be connected, in a code which can be recognized by respectively arranged receivers based on different pulse lengths and different length of pulse gaps or pauses between clock pulses B and the pulse sequences A.

Example: Let it be assumed that the upper-beam headlights are to be commanded to be used, and that, consequently, switch 29 associated with control number 3 is closed. Data bus 26 supplies the information that number 3 is to be controlled from the data input unit 27 to the microprocessor or microcomputer 25. The microcomputer processes the information in accordance with a simple program such that the central station 10 will provide a cyclical light pulse sequence A (FIG. 2) through the coupler 21 on the light guide 15. The cyclical light pulse sequence, in order to address the device 18 which is associated with control number 3, will have the third clock pulse of the sequence A followed by a longer pause than the other clock pulses, in order to characterize the third pulse as a 1-signal, see graph a of FIG. 2 and graph e. Since the third clock pulse will have a long gap thereafter, the third pulse of the pulse sequence A will address the receiver 12 which has a count number of 3 associated therewith. The receiver includes decoding means which interrogate the pulse sequence A and, upon recognizing the long pause after the third pulse sequence, recognizes, consequently, the 1-signal associated with the number 3. A time delay circuit, which has an adjustable time delay period within the receiver 12 then controls the headlight relay 18 to connect the headlight to ON. The headlight relay has an additional terminal 30 which is a normally closed (NC) terminal, which is used to acknowledge that the command has been recognized and is being carried out. The additional terminal 30 is also connected to the receiver 12—as will appear in connection with FIG. 5—and, as soon as it is open, causes extension of the third clock pulse of subsequent cyclical pulse sequences A by the receiver. This extended clock pulse, the third one since the third address has been addressed, and shown as the extended pulse B', graph f of FIG. 2, is sensed by the central station 10 and, in accordance with the program in the microcomputer 25, a corresponding output is applied to the display unit 28 over the data bus 26, or directly on a suitable indicator lamp on the associated switch 29 of the input unit 27, in accordance with the structural arrangement of the respective input/output and display units which are utilized.

To disconnect the relay, the switch 29 associated with count number 3 is again opened. The sequence of pulses A, after the third pulse, will then have a shorter gap occur therebetween which is recognized by the receiver which is programmed to decode the count number 3 as the OFF signal. This disconnects the relay 18 and, consequently, closes the NC contact 30, thus inhibiting extension of the third clock pulse from the normal width B (graph b of FIG. 2) to the extended pulse B' (graph f of FIG. 2). This, now normal return pulse, is again sensed by the central station and indication of the closed switch 3 and pulled-in relay 18 is released.

A data input unit 26 suitable for the system is shown in schematic, simplified form in FIG. 3. This data input unit is suitable to address the microcomputer 25 in the central station 10. A data input and output unit, also, is described in the referenced German Patent Disclosure Document DE-OS No. 28 14 124, to which U.S. Pat. No. 4,298,930, HAUBNER et al., corresponds.

The structure is simple, and its operation, likewise, is apparent from the diagram of FIG. 3: An 8×8 diode matrix 31 is serially interrogated by the microcomputer 25 over outputs 1a, 2a ... 8a. The state of the respective positions of the diode matrix is entered over the inputs 1b, 2b ... 8b into the microcomputer. FIG. 4 shows the arrangement of an operating switch 29 which, over a diode 32, connects the cross-over point of an input 1b with the output 1a. The information is stored in the microcomputer 25 and then applied in accordance with the code as a control 1-signal to the light guide 15 for transmission to all receivers, to which only that one of the receivers will respond which is coded to recognize the particular count position associated with the operated switch 29, in order to cause connection of the respectively controlled device or load. The matrix includes additional outputs which are decoupled by diodes 33 for time multiplex connection to provide output signals to the display 28, that is, at the time between scanning of inputs from the input line 1a.

Figure 5:
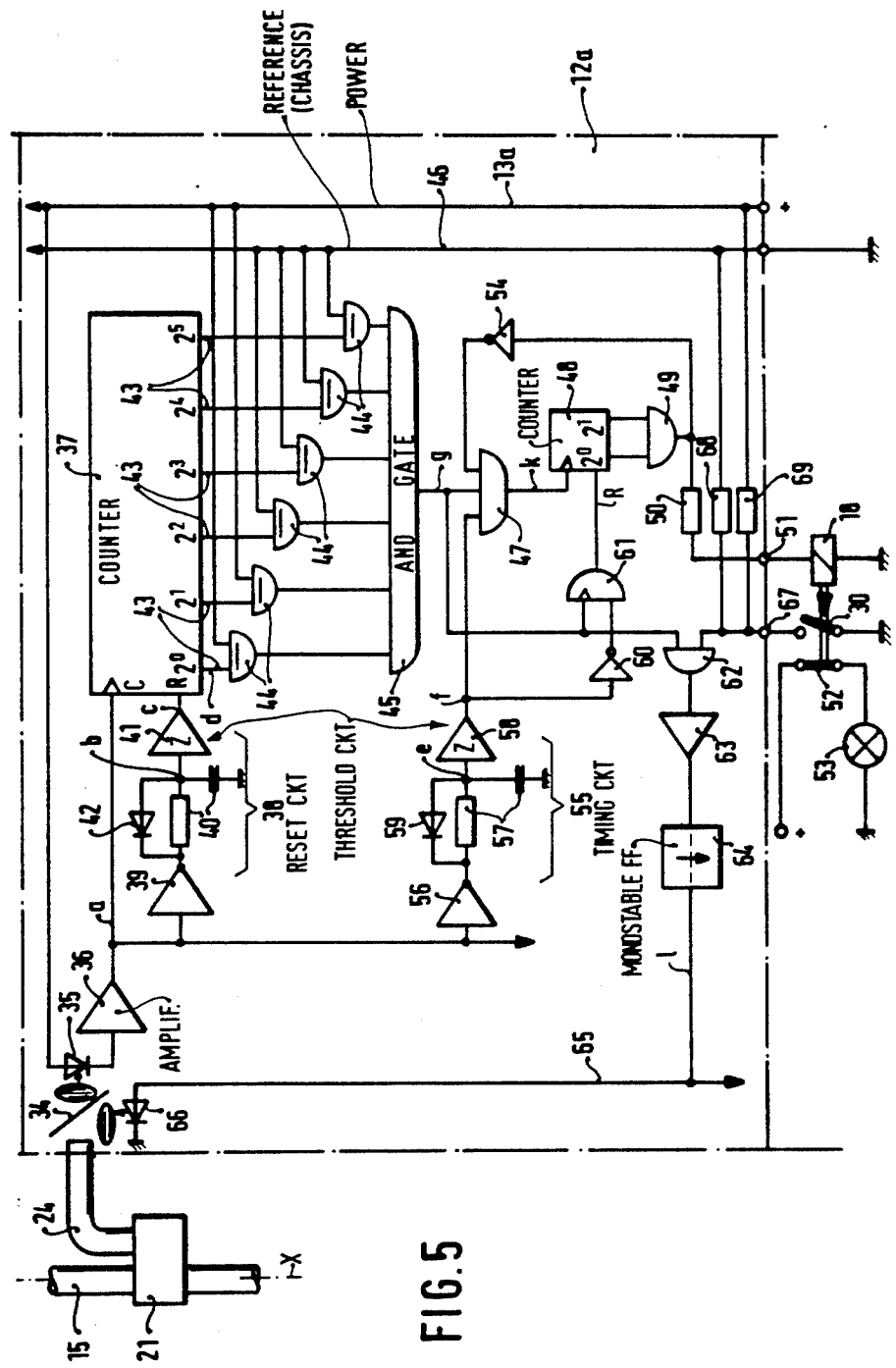
FIG. 5 is a schematic circuit diagram of a receiver station and a load connected thereto.

Circuit structure of the receiver, with reference to FIG. 5: The receiver 12 has a circuit structure 12a to recognize the count number 3 is located in the receiver unit 12 which, in accordance with FIG. 1, has additional parallel connected receiver circuitry. The parallel connected receiver circuitry can use some of the components also illustrated in FIG. 12 in time-multiplex.

The coupler 21 connected to the light guide 15 has the end of a glass fiber 24 connected to the receiving station 12. The light pulses in light guide 15 are transmitted over the fiber 24 to a semi-transparent mirror, located at an end face thereof, for transmission to a pick-up photo diode 35 which, with its anode, is connected to the receiver power bus 13a. The photo diode 35 has its cathode connected to the input of an amplifier 36, the output of which is connected to the count input of a pulse counter 37. The output of the amplifier 36, further, is connected to the input of a reset circuit 38 which includes an inverter 39, and an R/C timing circuit 40 which is connected to a threshold circuit 41. The R/C timing circuit 40 includes a discharge diode 42. The reset or count-erase stage 38 has its output connected to the reset input terminal R of the pulse counter 37. The pulse counter 37, in the example shown, has six output lines 43 from which, as well known, the count state can be determined in binary form. A group of exclusive OR-gates 45 are connected to the count outputs of the counter 37 so that any predetermined count state can be decoded by connecting the second input of the Exclusive OR-gate 44 in accordance with the required decode number to a corresponding positive or negative voltage, available from bus 13a, or ground or chassis connection 46, respectively. The outputs of the Exclusive OR-gates 44 are jointly connected to an AND-gate 45. In the example selected, the pulse counter 37 provides a pulse to the output of the AND-gate 45 when the decimal number 3 appears at the output of the pulse counter 37. To count a binary 11 (decimal 3), the first Exclusive OR-gates 44 are connected with their second to positive bus 13a; the remaining gates 44 have their second input connected to the negative or reference bus 46. The output of the AND-gate 45 is connected over a second AND-gate 47 to the count input of a cycle counter 48 which has two outputs. The cycle counter 48 has both its outputs connected over an AND-gate 49 and through a resistor 50 with an output terminal 51 of the receiving station 12. The load device associated with the receiver and which has the code number 3, in the example selected, the winding of the headlight relay 18, is connected to output terminal 51. In the position shown, the relay is energized and, consequently, the NC terminal 30 for acknowledgement is opened, whereas the normally open (NO) operating contact is closed, so that the head light 53 will be energized and will be lit.

The AND-gate 49 is additionally connected through an inverter 54 with a further input of the AND-gate 47 which has its output connected to the cycle counter 48. A third input of the AND-gate 47 controlling the count input of the cycle counter 48 is connected to the output of a timing circuit 55 which, at its input, is connected to the output of amplifier 36, and thus in parallel with the reset circuit 38. Similarly to the reset circuit 38, the timing circuit 55 has an inverter 56, an R/C timing element 57 which is parallel-connected by a discharge diode 59. The output from timing circuit 55 is connected through an amplifier 58 to two outputs, one being the third input of AND-gate 47, and the other through an inverter 60 to an AND-gate 61, the output of which is connected to the reset input R of the cycle counter 48. The AND-gate 61 has a second, dynamic input, which is connected to the output of the AND-gate 45 of the pulse counter 37.

The acknowledgment contact or terminal 30 associated with the relay 18 is connected through an input terminal 67 on the receiver 12a to one input of a further AND-gate 62. The other input to the AND-gate 62 is connected to the AND-gate 45 receiving the decoded count output from counter 37. The output of the AND-gate 62 is connected through an amplifier 63 to the input of a monostable flip-flop (FF) 64 which provides a timing interval. The output of the monostable FF 64 is connected over a line 65 to an LED 66, the cathode of which is connected to ground or chassis. When the relay 18 is energized, that is, when the switch is in the position shown so that terminal 67 is not grounded, the LED 66 will be illuminated for the period of time determined by the unstable time of the monostable FF 64 to extend the clock pulse B to the time as shown in B' (FIG. 2, graphs b and f). The ackowledgment terminal 30 of the relay 68 is connected to the tap point of a voltage divider formed by resistors 68, 69, which are connected across the positive supply bus 13a and the ground or chassis bus 46.

Further receivers in the station 12 can be connected to the terminals and connecting lines of the receiver unit 12, where indicated by arrows therein.

Operation—basic code recognition—with reference to FIG. 6: The line or graph identification of FIG. 6 is also indicated in FIG. 5 by similar letters, so that the pulses which appear at respective lines or junctions in FIG. 5 can readily be visualized by reference to the equally lettered graphs of FIG. 6, in which the voltage pulses arising at the lines or junctions a to l of FIG. 5 are shown.

The pulse sequence A'—FIG. 6, graph a—appears on the output from input amplifier 36, derived from sensing the pulse sequence A (FIG. 2) by the photo diode 35. The sequence A', amplified in amplifier 36, is applied to the count input C of the counter 37. This pulse sequence, further, is applied to the input of the reset circuit 38 and to the input of the timing circuit 55. The pause C' between cyclically repeating pulse sequences A' is sensed by the reset circuit 38. The capacitor of the R/C circuit 40 in the reset circuit 38 will charge gradually upon beginning of the pulse gap, see graph b of FIG. 6. After a predetermined time interval, which is shorter than the actual interval time between pulse sequences—for safety and to prevent erroneous switching—the output of the threshold switch 41 will have a reset pulse, as seen in graph c of FIG. 6, appear thereat which is applied to the reset terminal R of the counter 37, and which resets the counter to a predetermined count state, preferably zero or null.

The next clock pulse 1 will set the pulse counter 37 at its digital output to the number 1. Each further clock pulse causes the counter to step and to count. The graph d of FIG. 6 shows the signals at the first output of the pulse counter 37, which controls the first Exclusive OR-gate 44.

The pulse gaps between clock pulses are sensed both by the reset circuit or stage 38 as well as by the timing circuit 55. The pulse gaps between succeeding clock pulses are much too short to cause the reset circuit to respond. Consequently, the counter 37 is not reset during sequential pulses of the pulse sequence A'. Rather, the capacitor of the R/C circuit 4 will start from discharge state for each pause sequential to a pulse since each pulse causes discharge of the charge which has accumulated on the capacitor of the R/C timing circuit over the discharge diode 42, for grounding the output from the inverter 39 which, then, is connected to ground or chassis. Upon beginning of any pause or pulse gap, a second timing interval is sensed, however, by the timing circuit 55 and the capacitor of the R/C circuit 57 therein will charge gradually—see graph e of FIG. 6. The pulse gap between sequential clock pulses represents a control 0-signal. The timing R/C circuit 57 of the timing stage 55 is so arranged that the output of the timing circuit will have the signal of graph f appear only when the interval between sequential clock pulses is longer, that is, when a control 1-signal is being transmitted. At shorter pulse gaps, the capacitor of the R/C circuit 57 is discharged upon start of the subsequent clock pulses over the discharge diode 59.

EXAMPLE

The headlight relay 18—FIG. 1—is to be controlled by the third operating switch 29, which has the control number 3 associated therewith and, consequently, the receiver 12a likewise has the control number 3 address. Consequently, the receiver 12 must decode the binary 3 by correspondingly connected Exclusive OR-gates 44, so that all the six inputs of the AND-gate 45 will have 1-signals appear thereon, so that the output of AND-gate 45 will provide a 1-signal in accordance with graph g of FIG. 6 to the input of the AND-gate 47. During this pulse, the output of the timing stage 55, slightly delayed, will have a pulse appear thereon, and the output of the inverter 54 also still has a 1-signal, the AND-condition on AND-gate 47 is met and, therefore, the first counting pulse is applied to the count input of the cycle counter 48—see graph h of FIG. 6. This pulse is shown in FIG. 6 in broken-line representation since, as will be explained below, the pulse is suppressed by the inverter stage 54 as soon as the relay 18 is energized.

The output of the cycle counter 48 is set to a binary 1. The conjunction conditions on AND-gate 49 thus are not met. The second, or next pulse sequence, likewise, will have after the third clock pulse of the cycle counter 48, similar pulses appear thereon, so that the cycle counter 48 will be set to a binary 2. In the third cycle, the cycle counter will provide a binary 3 at the output thereof, thus meeting the conjunction conditions of the AND-gate 49 which causes the relay 18 to be energized, by current flow through the resistor 50. Resistor 50 is a current limiting and protective or coupling resistor. Simultaneously, the output of the gate 49 will control the inverter 54 to invert, and thus inhibit further counting of the cycle counter 48, so that, for subsequent counting cycles which recognize the address number 3 in the AND-gate 45, the conjunctive conditions of AND-gate 47 are no longer met. Consequently, relay 18 is held in the energized condition, as shown, and the head lamp 53 is placed on positive voltage over the load contact 52 thereof. The NC acknowledgment terminal 30 of the relay 18 will be open, and the input of the AND-gate 62 is thus removed from ground or chassis connection, to which the switch element of NC terminal 30 is connected, but rather will apply a voltage which is determined by the voltage division ratio of the resistors 68, 69. Since the second input of AND-gate 62 will likewise be "high", having the signal of graph g of FIG. 6 applied thereto, derived from the AND-gate 45, the output from gate 62, amplified in amplifier 63, will set the input of the monostable FF 64. The FF 64 provides at its output a signal as seen in graph l of predetermined length, determined by the unstable time of the monostable FF 64 which is applied to the luminescent diode 66 over line 65. A corresponding light pulse is thus applied to the light guide 24 and hence to the control line light guide 15. Of course, this pulse will also be seen by the photo diode 35. The pulse which is applied by the monostable FF 64 will extend the pulse B (FIG. 2), forming the acknowledgment signal.

Upon opening of the operating switch 29 which controls the relay 18, information is applied over the diode matrix 31 (FIG. 3) to the microcomputer 25 of the central station 10. The central station 10 will cause the pulse gap following the third pulse to be decreased to about half the previous pause time. Thus, upon beginning of the third pulse gap, the output from the AND-gate 45 (see graph g of FIG. 6) will have a signal thereon, the signal from the output of the timing stage 55—graph f of FIG. 6—will be missing since the short pause does not permit charging of the capacitor of the R/C timing circuit 57 to its sufficient level. The inverter stage 60 will thus provide a 1-signal to the AND-gate 61. The other input of the AND-gate 61 is controlled from the AND-gate 45, likewise a 1-signal, and thus the conjunction conditions of AND-gate 61 are met, which provides an output to the reset input R of the cycle counter 48 to reset the cycle counter 48 to zero. This disconnects the relay 18 and the count input of the cycle input 48 is, over the inverter 54, ready for a new count sequence. Upon drop-out of relay 18, the NC acknowledgement terminal 30 will close, placing the input of AND-gate 62 to ground, and canceling the conjunction conditions thereof. Consequently, the monostable FF 64 is no longer energized and, as a result, the third clock pulse is not extended by the monostable FF 64, so that the acknowledgment signal on the display 28 or on the appropriate switch 29 will extinguish.

The cycle counter 48 insures that the device 18 is not energized by a possible stray pulse applied to, or sensed by the receiving station 12. The cycle counter 48, thus, counts a predetermined number of pulses which are to control operation of the device, in this case energization of relay 18; three such pulses, in three sequential pulse trains or sequences A, are suitable. The device 18 is thus commanded to ON state only if three sequential pulse trains or sequences A provide the appropriate command. The high frequency of the pulse sequence does not cause a delay which can be noticed when controlling a device to be ON or to turn a device OFF.

The information or data coding, thus has the following characteristic. Reference may also be had to FIG. 6:

(1) Pulses A (FIG. 1) are transmitted from the central station 10.

(2) The number of the pulses is counted in counter 37.

(3) The length of the pulse gaps between sequentially counted pulses is sensed by the timing circuit 55 (FIG. 5), and (a) if the lengths of the pulse gaps are within a first time duration, the counter will continue to count, for example recognizing this first or shorter length as a "zero" value;

(b) if the length of a pulse gap after a counted pulse has a longer or second duration count, as determined by the timing circuit 55, a count state which is to be recognized will have been found, and the resulting count state is then the one which is to be recognized by the particular station.

(4) For answer-back, when a subsequent cycling sequence—in the example, the third cycling sequence as determined by the sequencing counter 48—is received, and if the receiver has responded, the reset control monostable FF 64 is also set which will emit a pulse to extend the decoded one—see line g of FIG. 6, and line l. In the example selected, this would be the third pulse.

For synchronization, the central station will also transmit (5) a pulse which is the first one of a sequence, see line a, FIGS. 2 and 6, followed by (6) an interval which is substantially longer than the first or second pulse gaps between data pulses, causing the reset timing circuit 38 to respond, thus resetting the counter 37, so that the next one of the pulses, which then will be of the sequence A—see (1) to (3) above—can be received and decoded. The arrangement of the pulse lengths and the pulse gaps—or the inverse, as explained above—thus permits exchange of data or control information as well as synchronization and timing between the central station and the respective receivers, so that both the central station and the respective receivers can all be connected in parallel to the single bus 8.

Various changes and modifications may be made, and the invention is not restricted to the particular circuit of the data input unit 27, the central station 10, as well as the receiving stations 11, 12. Different circuit arrangements may be used. It is important for the present invention, however, that for selective control of the device, and monitoring of the operation thereof, all signals necessary thereto are applied over a single control line, or control conduit connected between the central station 10 and the respective receiving stations, and that signal transfer is effected over this single conduit or line in both directions, to permit interchange of signals between the central station and respective receivers.

It is not necessary to use light guides as the transmission conduit; rather than using a light guide 15, a single electrical control line may also be used. Light guides, however, are immune against electromagnetic disturbance fields which, particularly in mobile applications, and especially in motor vehicles, may lead to stray or erroneous pulses. Such disturbance fields and disturbance pulses arise in the on-board vehicular network of automotive vehicles. A remote-control system utilizing a light guide can employ a clock frequency which is substantially higher than that possible with an electrical conductor, so that the number of load devices connected to the ring bus system 8, or the number of sensing stations, can be substantially higher than with electrical conductors, without lowering the operating reliability. The frequency of the pulse train A which, in a preferred example, is in the order of about 20 KHz, may readily be increased. This, of course, then also increases the cycling frequency since the duration of the respective pauses between cycles, that is, the gaps C and C' (FIGS. 2, 6) can be made shorter.

The control switches 29 of the remote-control system, when used with an automotive vehicle, can be attached to a stalk secured to the steering post or to the dashboard or otherwise located in a motor vehicle to be readily accessible to the operator, and then connected to the diode matrix 31 through short connecting cables. Input of switching information can be stored in the microcomputer 25 in 8×8 RAM storage locations for addressing an interrogation during the synchronizing pause C, see graphs a and c, FIG. 2. The acknowledgment signals from the devices are stored in 4×8 RAM storage locations in the form of digital information, and applied by a suitable program during the synchronization pause cyclically to the display unit 28, or to suitable and appropriate monitoring or indicator lamps secured on or integrated with the switches 29.

The respective receivers, preferably, are constructed as integrated units, in which the respective pulse counters 37 are programmed over the respective Exclusive OR-gate 44 by pin-coding to respond to a predetermined count state of the counter. This makes it possible to utilize identical receivers for all receiving stations which need only be programmed by physical connection of appropriate pins to, respectively, positive or reference potential, in accordance with well known binary codes, to respond to the assigned control number of the device which is to be commanded by the respectively assigned number of the switch, or an assigned number of an interrogation signal generated in the microprocessor 25, for example to provide read-out in predetermined intervals of sensors on the motor vehicle, for example the fuel gauge or engine temperature, with storage and continued display of the sensed quantity or temperature until the next read-out is effected.

Various other changes and modifications may be made within the scope of the inventive concept.

Use of a light guide cable for the control line has the additional advantage that the acknowledgment or other signals can be distinguished from the pulses of the pulse train not only by extended time but, for example, also by color. Thus, it is possible, for example, to provide an LED 66 which has a color output which differs from the LED within the central station 10 which provides the pulses forming the pulse sequence A. By interposition of suitable filters, the photo diode 35 can be made non-responsive to the output from the LED 66; a suitable filter within the coupler 21 between the light guide and the central station 10 then can be utilized for easy separation of pulses from the respective receivers to the central station, and pulses from the central station to the respective receivers. Different colors can also be used to distinguish between basically different receivers, for example colors of one pulse train for receivers which are to be controlled in ON/OFF mode—for example light switches—and receivers which are to transmit data to the central station, for example the level of fuel in the fuel tank. Decoding networks can then be used in the central station or in the receivers, respectively, which may have a code similar to that of other receivers, but which will not be controlled to respond because the respective photoelectric transducers 35, 66 in the receivers, and corresponding photoelectric transducers in the central station reject light for which the particular filters are not transparent, but accept information only if the light in the light guide is appropriate for the particular device or signal which is to be decoded.

We claim:

1. Method of remotely controlling operation of a remote-control operating system for selective addressing and control of one of a plurality of receivers (11, 12) from a central station (10),
   particularly to selectively address and control operation of accessory apparatus or devices (16, 17-20) in a motor vehicle, having
   a data input unit (27, 25),
   including operating switches (29) associated with respective apparatus or devices to address the respective apparatus or devices;
   a data receiver and display unit (28) to display the state of an addressed apparatus or device;
   a ring bus (X, 15), all the respective receivers associated with respective apparatus or devices being connected to said ring bus;
   code generating and recognition means (10, 10a) connected to the data input unit and to the ring bus, and hence to the receivers, for generating codes representative of one of the receivers, of a function thereof, and decoding data transmitted by the receivers indicative of execution of a decoded operation or command;
   and decoding means (37, 44, 45, 38, 55) and code generating means (64) included in the receivers, responding to a characteristic pulse arrangement representative of a code assigned to the respective receivers,
   comprising
   connecting the ring bus as a closed loop single communication line (X, 15) and connecting said code generating and recognition means (10, 10a) and all the receivers (11, 12) in parallel to the ring bus;
   generating, in the code generation and recognition means, cyclically recurring binary pulse sequences which comprise clock (B) and synchronizing signals (C), and data or control signals (A, 0, 1);
   generating in the receiver acknowledgment code signals (B'),
   wherein said signal generating steps comprise
   coding said cyclically recurring binary pulse sequences by generating
      (1) a synchronizing and clock signal combination which comprises a first pulse (B) and a subsequent pulse gap having a first and long time duration (C, C');
      (2) data or control signals which comprise
         (i) pulses (A, A') (1, 2, 3 . . . ) of a first predetermined pulse length to denote pulses being transmitted in a first direction between the code generating and recognition means and one of said receivers, and
         (ii) pulse gaps (a) between said pulses which have two different second and third gap lengths in dependence on whether the pulse gaps are representative of a binary ZERO or a binary ONE,
      both said pulse gaps being short with respect to said first long time duration, and
         (iii) pulses (B') of a second predetermined pulse length to denote pulses being transmitted in reverse direction between the code generating and recognition means and one of said receivers;
   and transmitting all said coded signal pulses with the respective pulse lengths and pulse gaps between the transmitter and receiver over said closed loop single communication line (X, 15) and forming said ring bus.

2. Method according to claim 1, wherein the ring bus comprises a light guide (15);

and wherein the generating steps comprise generating light signals in the form of light pulses of respectively different pulse widths, with respectively different gaps between the pulses and optically coupling said pulses to the light guide.

3. Method according to claim 1, including the step of decoding in the receivers the duration of respective pulses and pulse gaps, by comparing the time of duration of respective pulses and respective pulse gaps with a time reference formed by the clock signals (B).

4. Method according to claim 3, wherein the time duration of pulse gaps of a first gap length is representative of a binary 0, and of a different gap length is representative of a binary 1;

and a gap length which differs from either the gap length representative of binary 0 and binary 1 by a multiple of the extreme gap length representing binary 0 or binary 1 is representative of a new cycle of the cyclically recurring pulse sequences (A).

5. Method according to claim 4, wherein the step of generating an acknowledgment signal comprises changing the pulse width from that determined by a reference (clock B) by extending the width of one of the pulses of the pulse sequence to thereby place on the ring bus (X, 15) a signal which is modified by the receiver with respect to the signal which is transmitted by the code generation and recognition means, the extended pulse being recognized in the code generating and recognition means (10, 10a) for actuation of the data receiver and display unit (28).

6. Method according to claim 1, further comprising the step of counting cycles of binary pulse sequences including said synchronization and clock signal combination and the data or control signals comprising pulses (A, A') (1, 2, 3 ...) of a first predetermined pulse length and pulse gaps (a) between said pulses of one of said predetermined second and third gap lengths; and if the particular decoded number within the binary pulse sequence and associated with a specific receiver, as determined by the specific count decoding stage, has been decoded to determine that the same receiver is to be addressed by the same code being transmitted, in succession, a number of times in accordance with a predetermined count number, then and only then generating said pulses (B') of said second predetermined pulse length;

and only then controlling operation of the respective apparatus or device addressed in accordance with the code representative of the receiver associated with the selected apparatus or device.

7. Remote-control operating system for selectively addressing and controlling one of a plurality of receivers (11, 12), particularly for selective addressing and control of operation of accessory apparatus or devices (16, 17, 18, 19, 20) of a motor vehicle having a data input unit (27, 25) including operating switches (29) associated with respective apparatus or devices;

a data receiver and display unit (28) to display the state of addressed apparatus or devices with which the receiver is associated;

a ring bus (X, 15) to which all the receivers are connected;

code generation and recognition means (10, 10a) connected to the data input unit (27), the data receiver and display unit (28) and to the ring bus (8, 15), and hence to the receivers (11, 12), for generating codes representative of one of the receivers, or of a function of one of the receivers, and decoding data re-transmitted by the receivers indicative of execution of a decoded operating command;

and decoding means (37, 45, 38, 55) included in the receivers responding to a pulse arrangement representative of a code appearing on the ring bus (8, 15), wherein the ring bus comprises a closed loop single communication line X, 15;

said code generating and recognition means (10, 10a) and all said receivers (11, 12) being connected in parallel to the ring bus;

the code generation and recognition means generate a digital binary pulse code, coupled to the ring bus, which comprises cyclically recurring binary pulse sequences which include clock (B) and synchronizing signals (C), and data or control signals (A, 0, 1);

the code generation and recognition means (10, 10a) comprises (1) means for generating a synchronizing (B) and clock (C) signal, in which said synchronizing and clock signal comprises a first pulse (B) and a subsequent pulse gap having a first and long time duration (C, C'); and (2) means for generating data or control signals which comprise (i) pulses (A, A'; 1, 2, 3 ...) of a first predetermined pulse length to denote pulses being transmitted in a first direction between the code generating and recognition means (10, 10a) and all said receivers (11, 12), and (ii) pulse gaps (a) between said pulses which have two different second and third lengths, in dependence on whether the pulse gaps are to represent a binary ZERO or a binary ONE, both said pulse gaps being short with respect to said first long time duration;

the receivers include, each, code generating means (64) generating acknowledgment signals (B'), said acknowledgment signals comprising pulses of a second predetermined pulse length, to denote pulses being transmitted in reverse direction between the pulse generating and recognition means and one of said receivers;

the closed loop single communication line (X, 15) carrying all the signals with the respective coding distinctions for addressing being represented by respective widths of pulses and gaps between pulses.

8. System according to claim 7, wherein said single communication line comprises a light guide (15) carrying said recurring pulse sequences (A) in the form of light pulse sequences being transmitted between the code generation and recognition means (10, 10a) and all of said receivers (11, 12, 12a).

9. System according to claim 8, further including light branching and coupling stations (21) positioned to transfer light signals between the code generation and recognition means (10), the light guide (15), and between the receivers (11, 12) and the light guide;

and wherein said branching and coupling stations (21) include opto-electrical transducers (22, 23; 35, 36) to convert the light pulses in the light guide to electrical signals.

10. System according to claim 9, wherein the opto-electrical transducers at said branching and coupling stations (21) include optical-electrical receivers (23, 35) to receive light signals coursing in the light guide, and opto-electrical transmitters (22, 66) to transmit light pulses in accordance with applied electrical signals into the light guide for coursing in the form of light pulses therein.

11. System according to claim 9, wherein the branching and coupling stations include a light guide fiber (24) having a mirrored end surface (24a), the mirrored end surface being coupled to the light guide (15) to form an angle with respect to the longitudinal axis (X) of the light guide.

12. System according to claim 11, wherein the light guide fiber (24) terminates at a position adjacent said opto-electrical transducers;
and said transducers include a photo diode (35) and a light emitting diode (66).

13. System according to claim 9, wherein at least one of the receivers (12) forms a receiving station having a plurality of receiver units (12a) included therein, said receiver units being commonly coupled to a single branching and coupling station (21).

14. System according to claim 7, wherein the decoding means in the receiver are responsive to the duration of pulse gaps and include
a pulse counter (37) having a reset (R) input, the count input of the pulse counter being connected to receive pulses from said single communication line;
a reset circuit (38) coupled to receive pulses from said single communication line, and including a timing circuit (40, 42) responsive to a first, and long gap between recurring pulses, to sense the beginning and presence of one of the cyclically recurring pulse sequences (A) coursing in the single communication line forming the ring bus, and being connected to the reset terminal of the pulse counter to reset the pulse counter to a predetermined value upon failure to sense occurrence of pulses, for said first and long predetermined interval on the ring bus;
a count decoding stage (44, 45) coupled to the pulse counter (37) and connected to recognize a predetermined count number being counted by the pulse counter after having been reset;
and operating circuit means (50, 51) connected to the respective device, and controlled by the output from said pulse counter to energize said pulse counter if, and only if, the count number designed to the particular apparatus or device is recognized by the count decoding stage.

15. System according to claim 14, wherein the decoding means in the receiver further include a gap timing circuit (55) connected to receive the pulses of the cyclically recurring pulse sequence and providing an output signal (0, 1) representative of the time interval or gap between pulses to recognize a code formed by making the gap between recurring pulses within the predetermined pulse sequence longer than between other pulses to thus characterize the particular selected pulse.

16. System according to claim 15, wherein the decoding means further includes a conjunctive gate (47) having the output from said count decoding stage (44, 45) applied thereto and from said gap timing circuit (55) if the gap timing circuit has recognized an extended pause representative of a 1-signal between the pulse recognized by the count decoding stage and the next succeeding pulse.

17. System according to claim 14, further including a pulse sequence cycle counter (48) connected between the output of the count decoding stage (44, 45) decoding the outputs from the pulse counter (37) and said operating circuit means (50, 51), said cycle counter providing an output to the operating circuit means if, and only if, the particular decoded number associated with the specific receiver as determined by the specific count decoding stage has determined that the same receiver is to be addressed by the same code being transmitted, in succession, a number of times in accordance with the count number of the cycle counter.

18. System according to claim 16, further including a pulse sequence cycle counter (48) connected between the output of the count decoding stage (44, 45) decoding the outputs from the pulse counter (37) and said operating circuit means (50, 51), said cycle counter providing an output to the operating circuit means if, and only if, the particular decoded number associated with the specific receiver as determined by the specific count decoding stage has determined that the same receiver is to be addressed by the same code being transmitted, in succession, a number of times in accordance with the count number of the cycle counter;
and wherein the cycle counter is connected to and controlled by the output from the conjunctive gate (47).

19. System according to claim 18, further including an inverter stage (54) connected to the output of the cycle counter and additionally connected to the conjunctive gate (47) to inhibit further counting of the cycle counter after it had once counted through the predetermined number of cycles.

20. System according to claim 18, including logic circuit means (60, 61) connected to and controlled by the output (f) from the gap timing circuit (55) and controlling resetting of the cycle counter (48).

21. System according to claim 7, wherein the means for generating the pulses of a second predetermined pulse length in the receiver includes acknowledgment circuit means (30) providing an acknowledgment output signal representative of response of the device or apparatus in accordance with an addressed command transmitted from said data input unit through the code generating means;
an acknowledgment timing means (64), the output of said acknowledgment timing means being connected to provide an extension signal to said single communication line forming the ring bus,
said acknowledgment timing means being connected to and controlled by operation of a device to provide a timing pulse when the decoding means in the receiver recognizes the presence of a particular pulse in said cyclically recurring pulse sequence and associated with a specific receiver, to thereby extend the length of said pulse coursing in the ring bus and permit recognition of the extended pulse by the code generation and recognition means (10, 10a) in the central station, and thus permit display by the data receiver and display unit (28) that the addressed apparatus or device has received the addressing command.

22. System according to claim 14, further including an acknowledgment circuit means (30) providing an acknowledgment output signal representative of the apparatus or device having been properly addressed and carrying out the command as instructed by the data input unit;

and an acknowledgment timing means (64) comprising a monostable circuit (64) controlled from the output (g) of the count decoding stage, the output of said acknowledgment timing means being connected to apply a signal to the single communication line (15) of the ring bus (8) to thereby extend the length of the pulse decoded by the count decoding stage and permit recognition of said extension of said decoded pulse by the code generating and recognition means (10) in the central station for display of acknowledgment of the operating command on the data receiver and display unit (28).

23. System according to claim 22, wherein said single communication line comprises a light guide;

and wherein the output of said acknowledgment timing means (64) is coupled to light emitting element (66) to extend a light pulse occurring within said light guide and forming the pulse decoded by the decoding means (44, 45) in the receiver, to thus, by continued application of light to said light guide, extend the length of said pulse.

24. System according to claim 19 or 20, wherein said single communication line (15) comprises a light guide.

* * * * *

UNITED STATES PATENT AND TRADEMARK OFFICE
CERTIFICATE OF CORRECTION

PATENT NO. : 4,459,591

DATED : July 10, 1984

INVENTOR(S) : Georg HAUBNER etal

It is certified that error appears in the above-identified patent and that said Letters Patent is hereby corrected as shown below:

Claim 24, Col. 20, line 12 should read

-- systems according to claim 14 or 20 --.

Signed and Sealed this

Twenty-eighth Day of May 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,459,591

DATED : July 10, 1984

INVENTOR(S) : Georg Haubner, et al

It is certified that error appears in the above-identified patent and that said Letters Patent is hereby corrected as shown below:

Column 1, line 19, "4,160,230" should be -- 4,160,238 --.

Signed and Sealed this

Thirtieth Day of July 1985

[SEAL]

Attest:

DONALD J. QUIGG

Attesting Officer     Acting Commissioner of Patents and Trademarks